(12) United States Patent
Tews et al.

(10) Patent No.: US 11,165,802 B2
(45) Date of Patent: Nov. 2, 2021

(54) NETWORK SECURITY ASSESSMENT USING A NETWORK TRAFFIC PARAMETER

(71) Applicant: Schweitzer Engineering Laboratories, Inc., Pullman, WA (US)

(72) Inventors: Cody W. Tews, Pullman, WA (US); Cassandra Seubert, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 469 days.

(21) Appl. No.: 16/206,733

(22) Filed: Nov. 30, 2018

(65) Prior Publication Data
US 2019/0173899 A1    Jun. 6, 2019

Related U.S. Application Data

(60) Provisional application No. 62/594,978, filed on Dec. 5, 2017.

(51) Int. Cl.
*H04L 29/06* (2006.01)
*G06N 7/00* (2006.01)
*G06N 20/00* (2019.01)

(52) U.S. Cl.
CPC ......... *H04L 63/1425* (2013.01); *G06N 7/005* (2013.01); *H04L 63/1433* (2013.01); *G06N 20/00* (2019.01)

(58) Field of Classification Search
CPC ................................................. H04L 63/1425
See application file for complete search history.

(56) References Cited

U.S. PATENT DOCUMENTS

| | | | | |
|---|---|---|---|---|
| 5,134,386 A | * | 7/1992 | Swanic | G08B 13/10 250/227.16 |
| 7,376,969 B1 | | 5/2008 | Njemanze | |
| 7,966,659 B1 | * | 6/2011 | Wilkinson | H04L 63/0209 726/22 |
| 9,628,497 B2 | * | 4/2017 | Zambon | G06N 20/00 |
| 9,729,568 B2 | | 8/2017 | Lefebvre | |
| 2015/0264073 A1 | | 9/2015 | Tavakoli | |
| 2017/0126745 A1 | * | 5/2017 | Taylor | H04L 63/0227 |
| 2017/0318053 A1 | * | 11/2017 | Singh | H04L 63/1425 |

OTHER PUBLICATIONS

David Plonka, Andres Jann Tack, "An Analysis of Network Configuration Artifacts" Presented at 23rd Large Installation System Administration Conference, Baltimore, MD. Nov. 2009.
Paula Doyle, "Introduction to Real-Time Ethernet I" The Extension, vol. 5 Issue 3, May 2004.

(Continued)

*Primary Examiner* — William S Powers
(74) *Attorney, Agent, or Firm* — Fletcher Yoder, P.C.; Richard M. Edge

(57) ABSTRACT

Systems and methods may be used to assess network communications by generating one or more thresholds for network traffic parameters based at least in part on a generated baseline for the network traffic parameter in the supervisory control and data acquisition system based on communications within the industrial network. Network communications may be assessed by determining whether the communications in the industrial network fall within the one or more thresholds for the network traffic parameter.

20 Claims, 7 Drawing Sheets

(56) References Cited

OTHER PUBLICATIONS

Paula Doyle, "Introduction to Real-Time Ethernet II" The Extension, vol. 5 Issue 4, Jul. 2004.

Cathy A. Fulton, San-Qi Li, "Delay Jitter First-Order and Second-Order Statistical Functions of General Traffic on High-Speed Multimedia Networks" IEEE/ACM Transactions on Networking, vol. 6, No. 2, Apr. 1998.

Upeka Premaratne, "Empirical Network Jitter Measurements for the Simulation of a Networked Control System" 2014 International Conference on Advances in ICT for Emerging Regions, Dec. 2014.

Marek Szmechta, Pawel Aksamit, "Modeling Packet Delay Distributions in an Industrial Telemetry System" 5th International Symposium on Computational Intellifence and Intellifent Informatics, Sep. 2011.

Tingting Hu, Ivan Cibrario Bertolotti, "Overhead and ACK-Induced Jitter in Modbus TCP Communication" 2015 IEEE 1st International Forum on Research and Technologies for Society and Industry Leveraging a better tomorrow (RTSI). Nov. 2015.

Jason But, et al., "Passive TCP Stream Estimation of RTT and Jitter Parameters" The IEEE Conference on Local Computer Networks 30th Anniversary, Nov. 2005.

L. Rizo, et al. "Cauchy Distribution for Jitter in IP Networks" 18th International Conference on Electronics, Communications and Computers, Mar. 2008.

L. Rizo, et al. "Packet Variation Delay Distribution Discrimination Based on Kullback-Leibler Divergence" 2010 IEEE Latin-American Conference on Communications, Sep. 2010.

Pradhumna L. Shrestha, et al., "A Novel Analytical Model and its Test Bed Verification for Network Convert Timing Channels" 2015 IEEE Conference on Communications and Network Security, Sep. 2015.

Lei Qian, Brian E. Carpenter "Some Observations on Individual TCP Flows Behavior in Network Traffic Traces" The 11th International Symposium on Communications & Information Technologies, Oct. 2011.

David Murray, Terry Koziniec "The State of Enterprise Network Traffic in 2012" 18th Asia-Pacific Conference on Communications (APCC), Oct. 2012.

Robert Rawlyk "Ethernet and Implementation in Automation" Beckhoff Automation LLC, Burnsville, MN, Mar. 2005.

Federico Simmross-Wattenberg, et al., "Anomaly Detection in Network Traffic Based on Statistical Inference and_Stable Modeling" IEEE Transactions on Dependable and Secure Computing, vol. 8, No. 4, Jul. 2011.

Li Zheng, et al., "Characteristics of Network Delay and Delay Jitter and its Effect on Voice over IP (VoIP)" IEEE International Conference on Communications, Jun. 2001.

Galil Motion Control "Evolution of Ethernet in Control Systems" Jan. 2014. Retrieved from http://www.galilmc.com/news/ethernet.

"Overview to recent advances in Ethernet used in industrial IO communication networks" May 2003. Retrieved from https://www.google.com/url?sa=t&rct=j&q=&esrc=s&source=web&cd=1&cad=rja&uact=8&ved=2ahUKEwjfoN-Sy8biAhWHVN8KHdroDeYQFjAAegQIBRAC&url=https%3A%2F%2Fpdfs.semanticscholar.org%2Fae2e%2Fa2347573473f2fe6f354a6434a72a0eb50c4.pdf&usg=AOvVaw0gpRDFGfF7cTBhbudTgGB3.

* cited by examiner

NETWORK SECURITY ASSESSMENT USING A NETWORK TRAFFIC PARAMETER

CROSS-REFERENCE RELATED APPLICATIONS

This application claims priority to U.S. Provisional Application No. 62/594,978, entitled "Network Security Assessment Using Time Artifacts," filed on Dec. 5, 2017, to which this application incorporates in its entirety for all reasons.

BACKGROUND

Field of the Present Disclosure

This disclosure relates to communication security assessment using timing artifacts. More particularly, this disclosure relates to establishing communication timing baselines between devices and using the established baselines to assess the communications system.

Description of Related Art

Industrial control systems ("ICSs") are commonly used by utilities and industry to implement equipment and process control. The ICSs may include intelligent electronic devices ("IEDs") in communication with equipment, and configured to monitor and control the equipment. The ICSs may be configured to operate an industrial system, facilitating communication between IEDs such that the industrial system as a whole may be controlled using the ICS. Accordingly, the ICSs may include network communications devices to facilitate communications between IEDs. The communications devices may be configured to operate according to one or more communications protocols.

The ICSs may include purpose-built equipment with embedded systems designed to provide real-time control and protection for physical equipment in the industrial system. To achieve real-time performance, these platforms may utilize real-time operating systems with guaranteed-timing task schedulers. The communications devices service the control loop and may prioritize tasks that support the control loop. For instance, a supervisory control and data acquisition ("SCADA") communication task may receive a medium priority along with other ancillary services. However, these ICSs may be subject to faults or failures for various reasons. For example, the ICSs may be targets of security attacks and/or may undergo configuration changes (e.g., changes to network and/or changes to devices in the network) without suitable compensation for the changes.

Embodiments of the present disclosure may be directed to one or more of the problems set forth above.

DETAILED DESCRIPTION

Figure 1:
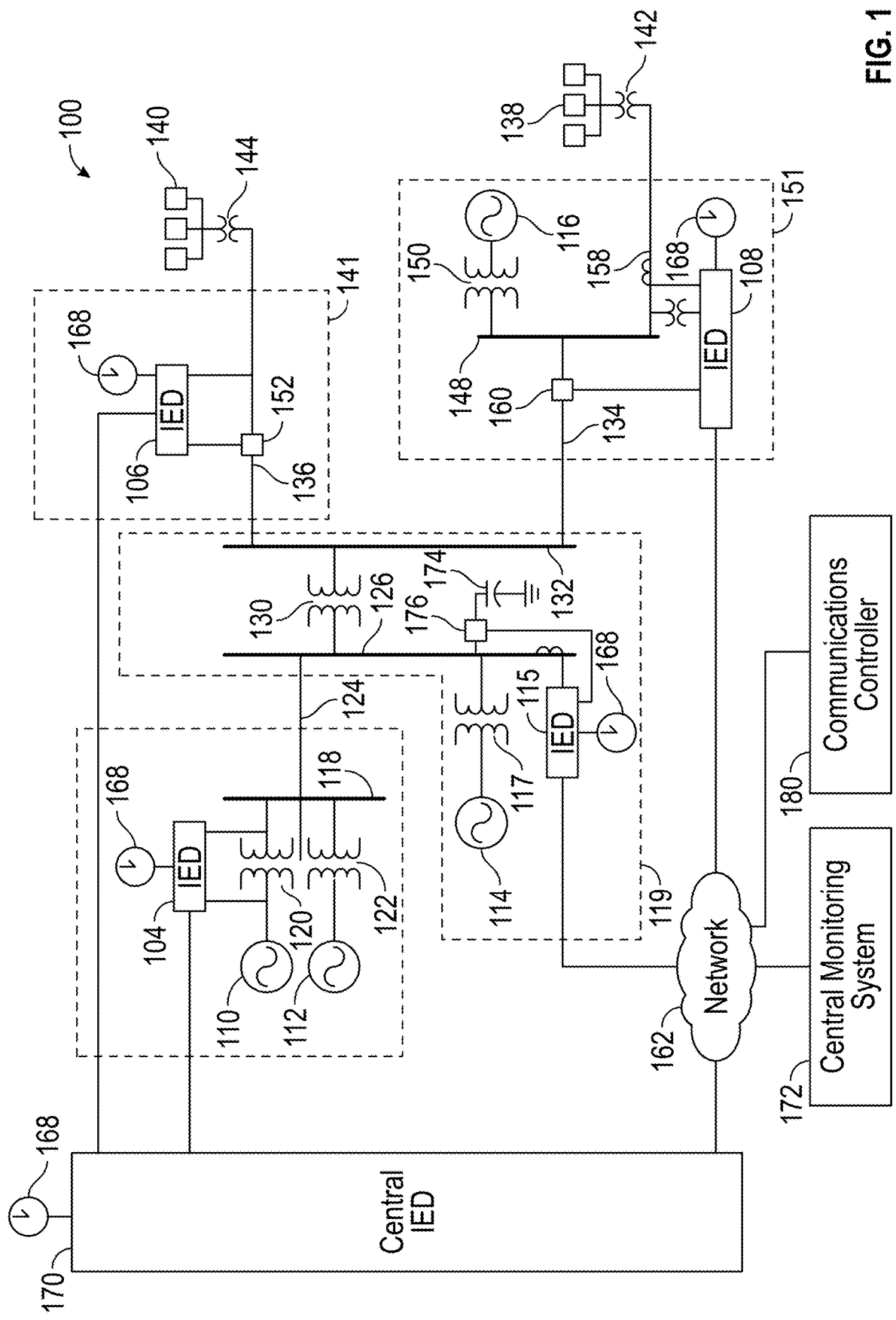
FIG. 1 illustrates a simplified diagram of an embodiment of an electric power delivery system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Industrial control systems ("ICSs") are commonly used by utilities and industry to implement equipment and process control. The ICSs may include intelligent electronic devices ("IEDs") in communication with equipment, and may monitor and control the equipment. The ICSs may operate an industrial system, facilitating communication between IEDs such that the industrial system as a whole may be controlled using the ICS. Accordingly, the ICSs may include network communications devices to facilitate communications between IEDs. The communications devices may operate according to one or more communications protocols.

The ICSs may include purpose-built equipment with embedded systems designed to provide control and protection for physical equipment in the industrial system. ICS platforms and/or other platforms with deterministic communication schemes may utilize operating systems with timing task schedulers. The communications devices service the control loop and may prioritize tasks that support the control loop. For instance, a supervisory control and data acquisition ("SCADA") communication task may receive a medium priority along with other ancillary services.

The communications devices may include a scheduler to perform scheduling and/or optimization of tasks and available resources. The precision by which the schedule may service the SCADA communication task is a function of the scheduler optimization. In a lightly loaded environment, the scheduler may have better precision in servicing the SCADA communication task. Conversely, in a heavily loaded environment, the scheduler may may establish SCADA communication tasks relative to each other and/or relative to other tasks in the ICS. In a steady-state system, the scheduler optimization may induce a measurable fingerprint into the routine SCADA network traffic from a device.

A monitoring system for monitoring industrial communications systems may determine a status of the communications system. Such monitoring may determine an occurrence of a security event, communications stresses, and/or the like. To facilitate network assessment, timing characteristics of network traffic of the communications system may be monitored. Communications characteristics for the communications system may be set when the devices of the network are installed. After installation, performance of the components (e.g., SCADA) may be relatively static. Changes to a SCADA system, including adversarial actions, appear as anomalous system performance compared to baseline timing distributions of the measurable fingerprint. SCADA networks may be relatively deterministic with measurable fingerprints. An amount of jitter distribution in the network may be used to estimate changes. For example, a deviation from an expected timing distribution of the measurable fingerprint may indicate a change in topology, an equipment addition or removal, abuse of routing tables, a compromise of firmware, and/or other interesting events that may be used in an attempt to adversarially compromise system operation.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, for the sake of brevity and clarity, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein may be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, include one or more physical or logical blocks of computer instructions, which may be organized as a routine, program, object, component, data structure, or the like, that performs one or more tasks or implements particular abstract data types.

In certain embodiments, a particular software module or component may include disparate instructions stored in different locations, which together may implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

Turning now to the figures, FIG. 1 illustrates a simplified diagram of an embodiment of an electric power delivery system 100, in which communication devices may facilitate communication in a network to support the industrial control system (ICS). For example, the electric power delivery system 100 may generate, transmit, and/or distribute electric energy to loads. As illustrated, the electric power delivery system 100 includes electric generators 110, 112, 114, and 116. The electric power delivery system 100 may also include power transformers 117, 120, 122, 130, 142, 144 and 150. Furthermore, the electric power delivery system may include lines 124, 134, and 158 to transmit and/or deliver power, circuit breakers 152, 160, and 176 to control flow of power in the electric power delivery system 100, busses 118, 126, 132, and 148, and/or loads 138 and 140 to receive the power in and/or from the electric power delivery system 100. A variety of other types of equipment may also be included in electric power delivery system 100, such as voltage regulators, capacitors (such as capacitor 174) and/or capacitor banks, and suitable other types of equipment useful in power generation, transmission, and/or distribution.

A substation 119 may include the electric generator 114, which may be a distributed generator, and which may be connected to the bus 126 through the power transformer 117 (e.g., step-up transformer). The bus 126 may be connected to a distribution bus 132 via the power transformer 130 (e.g., step-down transformer). Various distribution lines 136 and 134 may be connected to the distribution bus 132. The distribution line 136 may lead to a substation 141 where the distribution line 136 is monitored and/or controlled using an IED 106, which may selectively open and close circuit breaker 152. A load 140 may be fed from distribution line 136. The power transformer 144 (e.g., step-down transformer), in communication with the distribution bus 132 via distribution line 136, may be used to step down a voltage for consumption by the load 140.

A distribution line 134 may deliver electric power to a bus 148 of the substation 151. The bus 148 may also receive electric power from a distributed generator 116 via transformer 150. The distribution line 158 may deliver electric power from the bus 148 to a load 138, and may include the power transformer 142 (e.g., step-down transformer). A circuit breaker 160 may be used to selectively connect the bus 148 to the distribution line 134. The IED 108 may be used to monitor and/or control the circuit breaker 160 as well as the distribution line 158.

The electric power delivery system 100 may be monitored, controlled, automated, and/or protected using IEDs such as the IEDs 104, 106, 108, 115, and 170, and the ICS 172. In general, the IEDs in an electric power generation and transmission system may be used for protection, control, automation, and/or monitoring of equipment in the system. For example, the IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other suitable types of monitored equipment.

As used herein, an IED (such as the IEDs 104, 106, 108, 115, and 170) may refer to any processing-based device that monitors, controls, automates, and/or protects monitored equipment within the electric power delivery system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system including multiple IEDs.

A common time signal may be distributed throughout the electric power delivery system 100. Utilizing a common time source may ensure that IEDs have a synchronized time signal that can be used to generate time synchronized data, such as synchrophasors. In various embodiments, the IEDs 104, 106, 108, 115, and 170 may receive a common time signal 168. The time signal may be distributed in the electric power delivery system 100 using a communications network 162 and/or using a common time source, such as a Global Navigation Satellite System ("GNSS"), or the like. In some implementations of the system 100, distinct non-commmon time signals may also be used, but timing differences from these distinct time signals may be compensated for when establishing a baseline or identifying anomalies.

According to various embodiments, the ICS 172 may include one or more of a variety of types of systems. For example, the ICS 172 may include a SCADA system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a communications network 162. According to various embodiments, some IEDs may be in direct communication with other IEDs. For example, the IED 104 may be in direct communication with the central IED 170. Additionally or alternatively, some IEDs may be in communication via the communications network 162. For example, the IED 108 may be in communication with the central IED 170 via the communications network 162.

Communication via the communications network 162 may be facilitated by networking devices including, but not limited to, multiplexers, routers, hubs, gateways, firewalls, and/or switches. In some embodiments, the IEDs and the network devices may include physically distinct devices. In certain embodiments, the IEDs and/or the network devices may be composite devices that may be configured in a variety of ways to perform overlapping functions. The IEDs and the network devices may include multi-function hardware (e.g., processors, computer-readable storage media, communications interfaces, etc.) that may be utilized to perform a variety of tasks that pertain to network communications and/or to operation of equipment within the electrical power delivery system 100.

A communications controller 180 may interface with equipment in the communications network 162 to create a software-defined network (SDN) that facilitates communication between the IEDs 170, 115, and, 108 and the ICS 172. In various embodiments, the communications controller 180 may interface with a control plane (not shown) in the communications network 162. Using the control plane, the communications controller 180 may direct the flow of data within the communications network 162.

The communications controller 180 may receive information from multiple devices in the communications network 162 regarding transmission of data. In embodiments in which the communications network 162 includes fiber optic communication links, the data collected by the communications controller 180 may include reflection characteristics, attenuation characteristics, signal-to-noise ratio characteristics, harmonic characteristics, packet loss statics, and the like. In embodiments in which the communications network 162 includes electrical communication links, the data collected by the communications controller 180 may include voltage measurements, signal-to-noise ratio characteristics, packet loss statics, and the like. In some embodiments, the communications network 162 may include both electrical and optical transmission media. The information collected by the communications controller 180 may be used to assess a likelihood of a failure, to generate information about precursors to a failure, and to identify a root cause of a failure. The communications controller 180 may associate information regarding a status of various communication devices and communication links to assess a likelihood of a failure. Such associations may be utilized to generate information about the precursors to a failure and/or to identify root cause(s) of a failure consistent with embodiments of the present disclosure.

Figure 2:
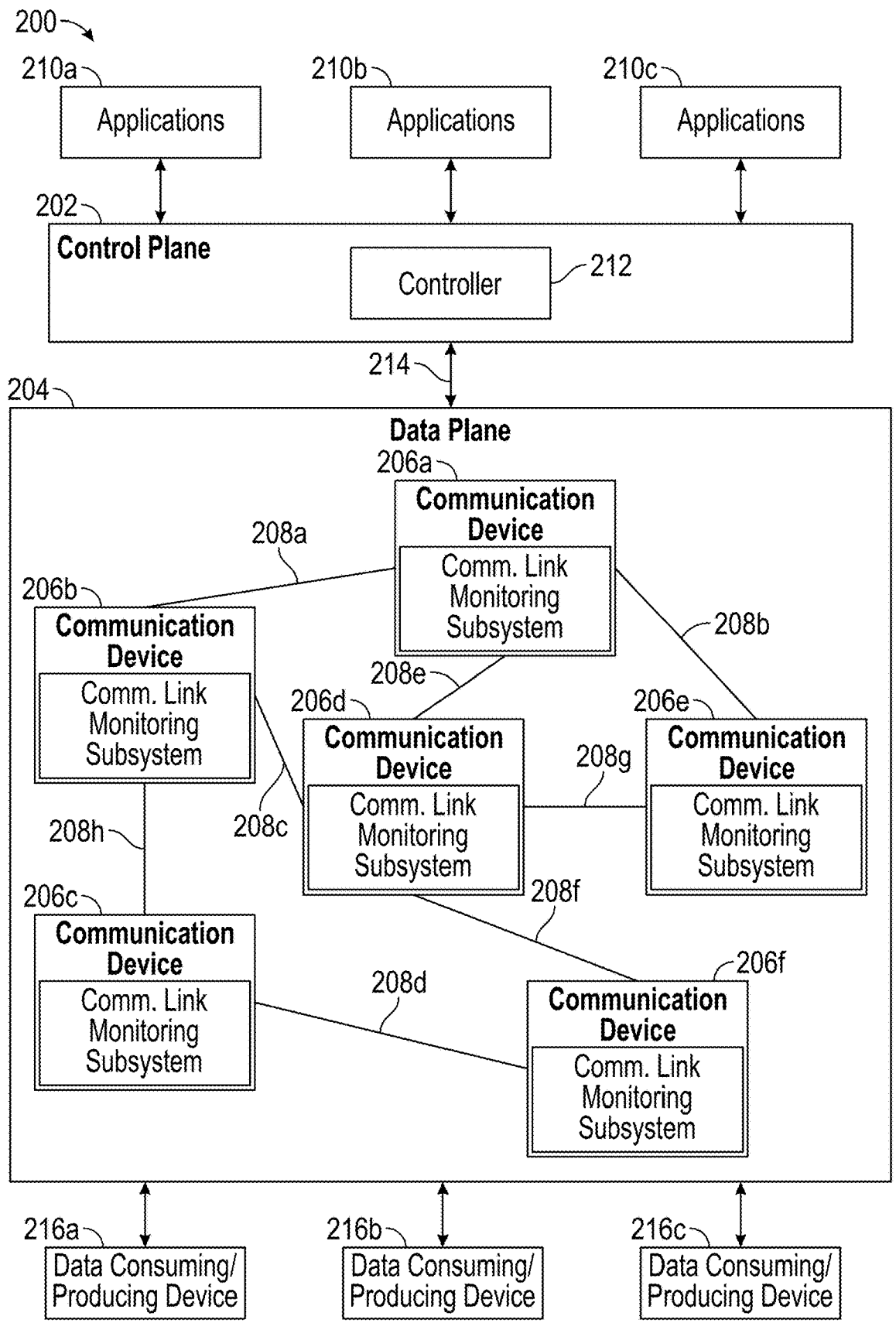
FIG. 2 is a block diagram of a communications system of the electric power delivery system, in accordance with an embodiment.

FIG. 2 illustrates a block diagram 200 of a communications system (such as a software-defined (SDN)) that may include a control plane 202, a data plane 204, and devices 216a-216c (e.g., data-consuming and/or data-producing devices) that may be deployed in the electric power delivery system 100 consistent with embodiments of the present disclosure. Although the communications network 162 specifically discussed here is an SDN, a variety of communications systems may be used, and the embodiments herein apply to any suitable communications system of the ICS 172. The control plane 202 directs the flow of data through the data plane 204. More specifically, a controller 212 may communicate with the communication devices 206a-206f via an interface 214 to establish data flows. The controller 212 may specify rules for routing traffic through the data plane 204 based on a variety of criteria.

As illustrated, the data plane 204 includes multiple communication devices 206a-206f in communication with one another via physical links 208a-208h. In various embodiments, the communication devices 206a-206f may be include switches, multiplexers, and/or other types of communication devices. The physical links 208a-208h may include Ethernet, fiber optic, and other forms of data communication channels. As illustrated, in some embodiments, the physical links 208a-208h between the communication devices 206a-206f may provide redundant connections such that a failure of one of the physical links 208a-208h does not completely block communication with an affected communication device. In some embodiments, the physical links 208a-208h may provide an N-1 redundancy or better.

Applications 210a-210c may represent a variety of applications operating in an applications plane. In the SDN architecture illustrated in FIG. 2, the controller 212 may expose an application programming interface (API) that the applications 210a-210c may use to configure the data plane 204. In this scenario, the controller 212 may act as an interface to the data plane 204 while the control logic resides in the applications 210a-210c. The configuration of controller 212 and applications 210a-210c may be tailored to meet a wide variety of specific needs.

The devices 216a-216c may represent a variety of devices within an electric power transmission and distribution system that produce or consume data. For example, data consuming/producing devices 216a-216c may include a pair of transmission line relays configured to monitor an electrical transmission line. The transmission line relays may monitor various aspects of the electric power flowing through the corresponding transmission line (e.g., voltage measurements, current measurements, phase measurements, synchrophasers, etc.) and may communicate the measurements to transmission line relays may be routed through the data plane 204 using a data flows implemented by the controller 212. In some embodiments, the devices 216a-216c may include any in a wide range of device types consistent with embodiments of the present disclosure.

Communications systems of the ICS 172 may be subject to fault or failure for various reasons. For example, the ICS 172 may undergo security attacks when communications system are breached. Communications systems may fail the purposes of the ICS 172 when traffic thereon slows communication between the IEDs and/or when certain communications devices fail.

As previously noted, a monitoring system for monitoring communications systems of the ICS 172 to determine a status of the communications system. Such monitoring may determine an occurrence of a security event, communications stresses, and/or the like.

To facilitate network assessment, timing characteristics of network traffic of the communications system may be monitored. For example, communications characteristics for the communications system may be set when the devices of the network are installed. After installation, performance of the components (e.g., SCADA) may be relatively static with a measurable fingerprint due to the scheduler.

Figure 3:
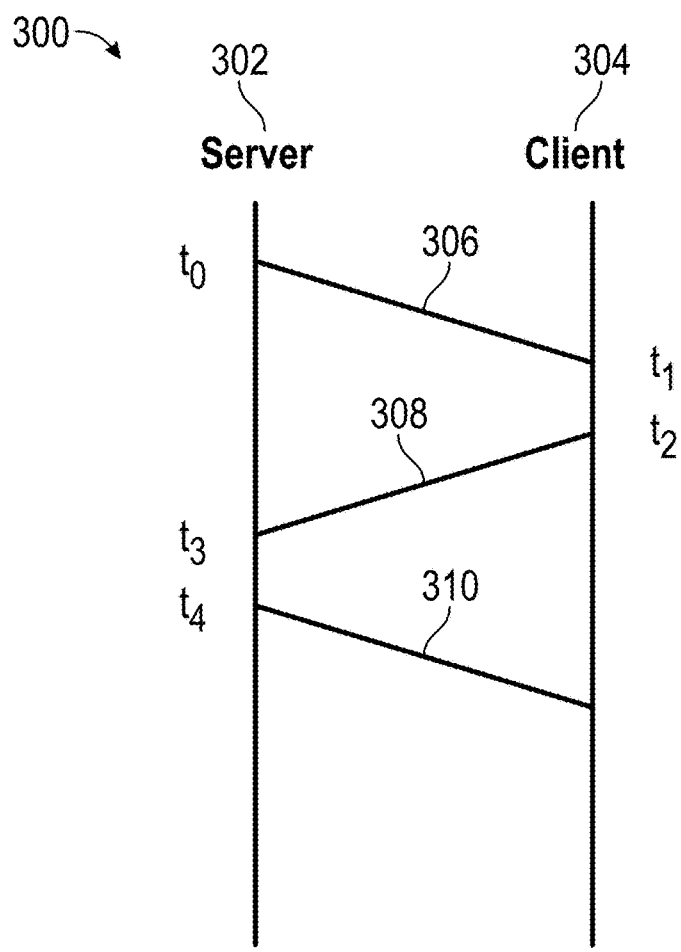
FIG. 3 is a timing diagram of a polling protocol of the communications system of FIG. 2, in accordance with an embodiment.

FIG. 3 illustrates an example timing diagram 300 of a polling protocol between a server 302 and a client 304 the communications system of the ICS 172. At time $t_0$, the server 302 sends a message 306 to the client 304. The client 304 receives the message 306 at time $t_1$. At time $t_2$, the client 304 responds to the server 302 with a response message 308. At time $t_3$, the server 302 receives the response message 308 from the client 304. At time $t_4$, the server 302 initiates another polling message 310.

The determinism of the ICS communications network may be measured in various ways, such as a server-centric determinism or a client-centric determinism. Server-centric determinism may be measured by calculating delay between polling messages sent from the server 302 to unique client devices. In the timing diagram 300, this value is calculated according to Equation 1:

$$t_{server} = t_4 - t_0 \quad \text{(Equation 1)}$$

Client determinism is measured by calculating the delay from when the client 304 receives the message 306 until the client 304 sends the response message 308 to the server 302. In the timing diagram 300, this value is calculated according to Equation 2:

$$t_{client} = t_2 - t_0 \quad \text{(Equation 2)}$$

To characterize communications of communications devices, multiple conversations between the communications devices may be analyzed and empirical distributions may be calculated for both the client 304 and the server 302. In some embodiments, the jitter measurements may be made with nonparametric statistics to prevent reliance on a predetermined parametric model. The nonparametric statistics may be used because a unique shape of the distributions may be deemed as fingerprints for the unique combination of server-client, firmware, settings, and/or network topology.

Figure 4A:
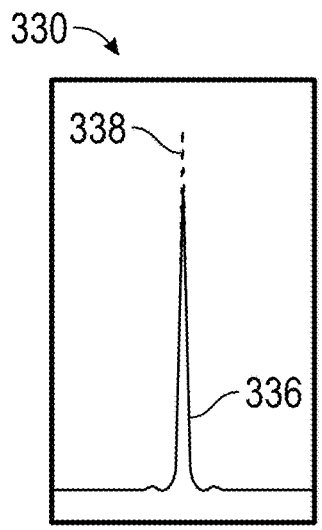
FIG. 4A is a timing signature with a level of jitter in the communications system, in accordance with an embodiment.
Figure 4B:
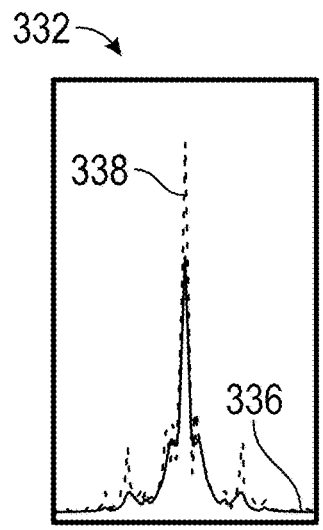
FIG. 4B is a timing signature with a change in the level of jitter in the communications system, in accordance with an embodiment.
Figure 4C:
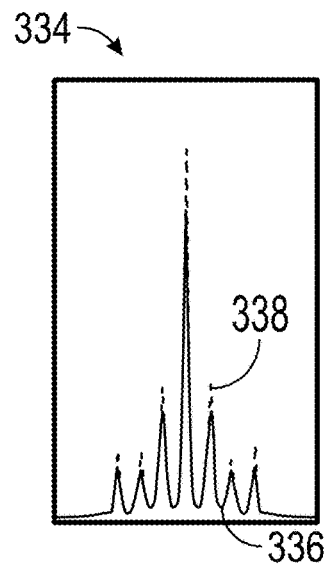
FIG. 4C is a timing signature with change in the level of jitter in the communications system, in accordance with an embodiment.

FIGS. 4A, 4B, and 4C illustrate example timing signatures 330, 332, and 334 obtained from servers 302 and/or clients 304 of a communications system for the ICS 172. The timing signatures 330, 332, and 334 may correspond to server and/or client jitter, and may be unique based on the type, number, arrangement, and/or configuration of devices present in the network. Probability mass functions ("PMF") for the jitter measurements have fingerprints that are used by several embodiments herein to identify changes in network topology, but it should be understood that any other suitable probability distributions may be employed. FIG. 4A illustrates a graph of a timing signature 330 as an example of jitter (e.g., server jitter) with devices present on the network. Similarly, FIG. 4B illustrates the timing signature 332 as an example having a second and higher level of jitter with different and/or additional devices present on the network. It should be noted that fewer devices generally may yield a signature with less variability, and PMF complexity generally may increase as devices are added.

FIG. 4C illustrates the timing signature 334 as the PMF of jitter while a secondary MODBUS master executes on a nearby human-machine interface (HMI). Additionally or alternatively, the discussed techniquest may be applied to any poll-response protocol, such as a distributed Network Protocol (DNP), SEL® Fast Message protocol, International Electrotechnical Commission (IEC) 61850 protocol, and/or other poll-response protocols. The shape of the PMF illustrated in FIG. 4C indicates a change to the fingerprints illustrated in FIGS. 4A and 4B. Furthermore, as illustrated, each of the timing signatures 330, 332, and 334 includes a solid line 336 that is calculated for a limited time (e.g., one hour) and a dotted line 338 that is calculated for an entire data set.

Figure 5:
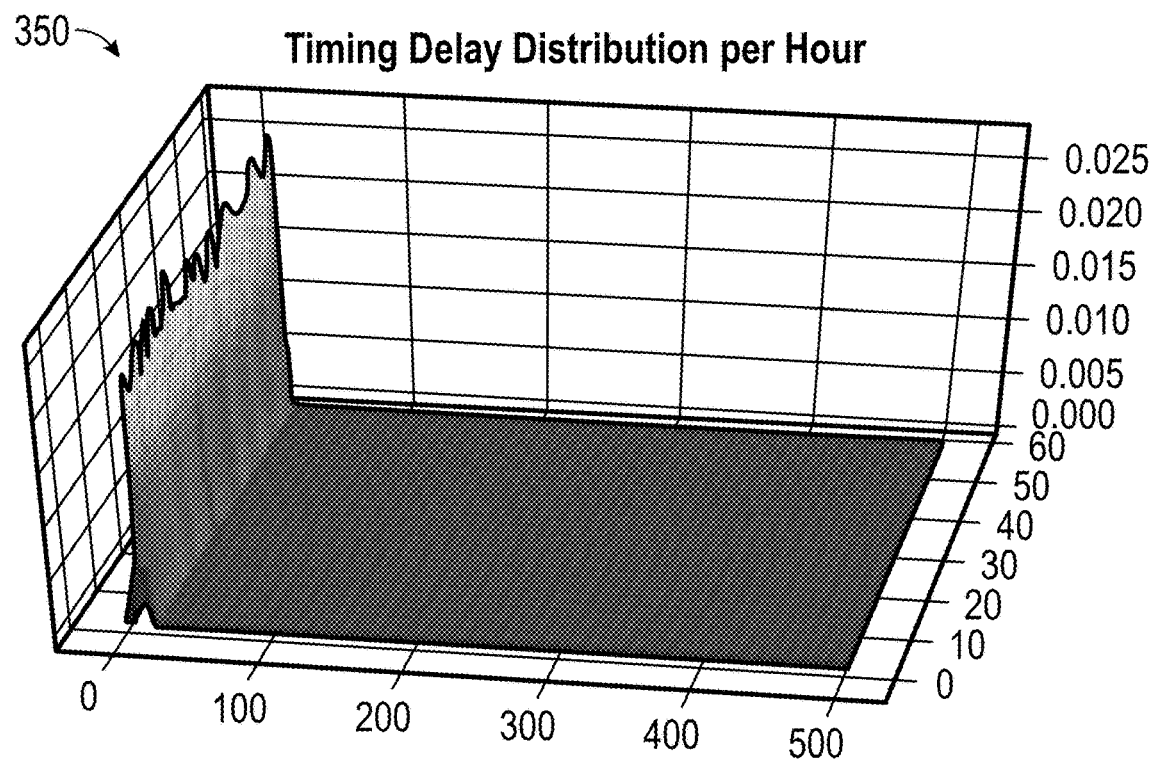
FIG. 5 is a timing delay distribution graph for server-centric jitter, in accordance with an embodiment.
Figure 6:
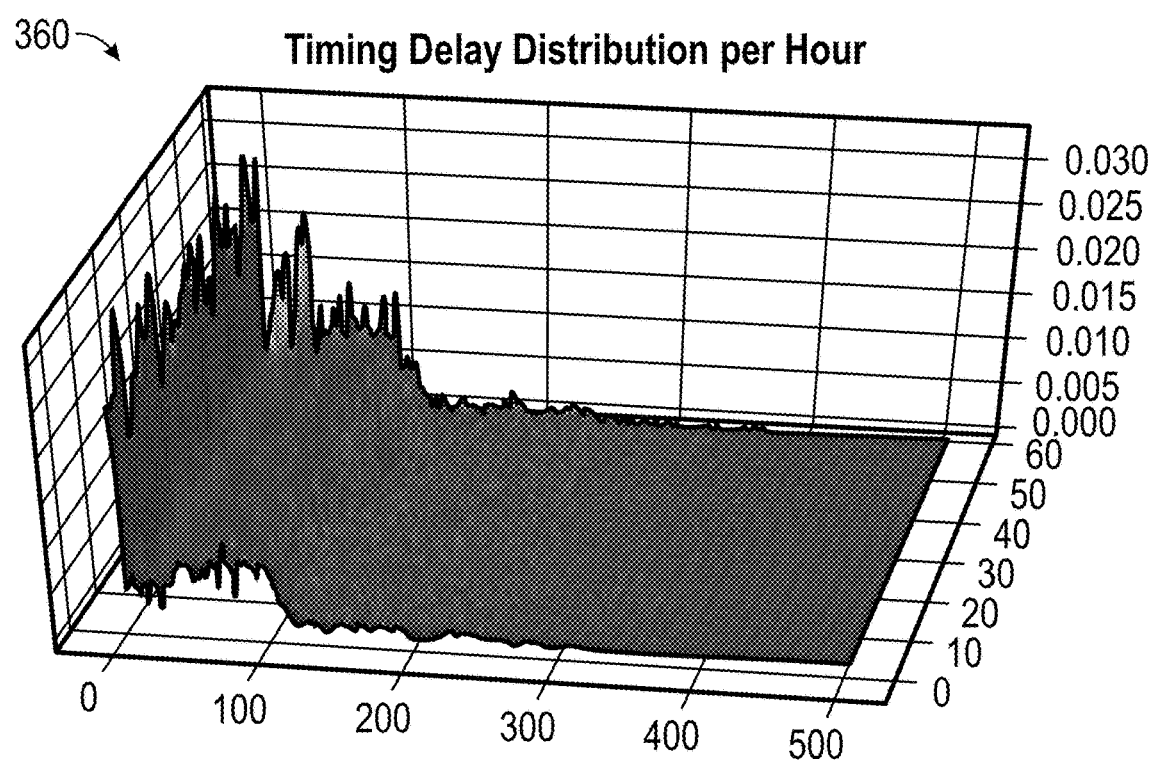
FIG. 6 is a timing delay distribution graph for client-centric jitter, in accordance with an embodiment.

To characterize devices using the timing signatures 330, 332, and/or 334, multiple conversations may be analyzed and empirical distributions may be calculated for both clients and servers over time. For instance, FIG. 5 illustrates a timing delay distribution graph 350 for MODBUS jitter for the server 302 over an interval (e.g., one hour), and FIG. 6 illustrates a timing delay distribution graph 360 for MODBUS jitter for the client 304 over the one-hour interval. These distributions may be used to develop the timing signature fingerprints.

Figure 7:
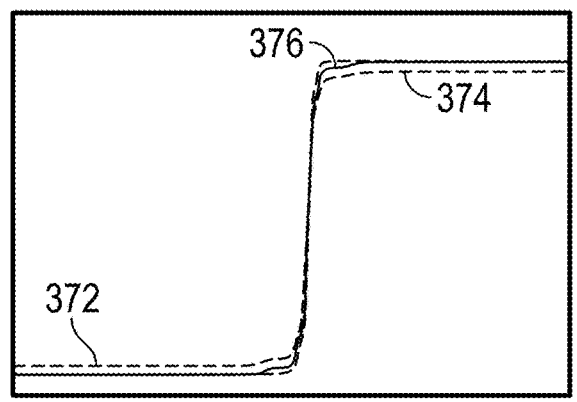
FIG. 7 is a graph with anomalous bounds on either side of a baseline distribution for jitter with a present distribution falling within the anomalous bounds, in accordance with an embodiment.

With the measurable fingerprints identified, normal and abnormal conditions may be identified. Different methods may be employed to relate empirical distributions drawn from the same population. In one embodiment, the Kolmogorov-Smirnov statistic and/or test may be used to describe how two empirical distributions drawn from the same population may be related. This result is used to place a probabilistic bound on deviations from the baseline distribution. For instance, FIG. 7 illustrates a graph 370 with bounds 372 and 374 for deviations from a baseline distribution, and a present distribution 376, as a probabilistic solution to determine an anomaly in the communications system. For example, the bounds 372 and 374 may be calculated using the Dvoretzky-Kiefer-Wolfowitz inequality. Where F(x) and G(x) are two empirical cumulative distribution functions (CDFs) describing two independent samples taken from the same network setup, Equation 3 may be used to determine the bounds 372 and 372:

$$P(sup_x |F(x) - G(x)| > \epsilon) \leq 2e^{-\frac{2\epsilon^2 nm}{n+m}} \quad \text{(Equation 3)}$$

Figure 8:
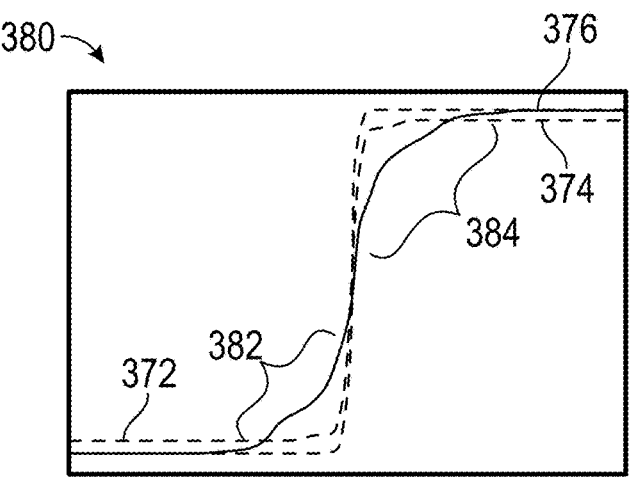
FIG. 8 is a graph with anomalous bounds on either side of a baseline distribution for jitter with a present distribution falling within the anomalous bounds, in accordance with an embodiment.

Using Equation 3, a confidence interval ("CI") may be set on F(x) such that G(x) will fall inside that interval some threshold percentage of the time (e.g., 75%, 80%, 85%, 90%, 95%, 97%, 99%, 99.5% percent of the time, or the like). Deviations from this expected variation may be deemed as abnormal activity. Since the present distribution 376 fits between the bounds 372 and 374, the network is functioning as expected. FIG. 8 illustrates a graph 380 with the present distribution 376 with portions 382 and 384 falling outside the bounds 372 and 374, thus indicating a network anomaly. The bounds 372 and 374 may generally follow the curvature of the baseline distribution. Here, the shape of the probability curve of the baseline distribution may be a general square wave, but the baseline distribution and resultant probability curve may include any suitable shape.

Figure 9:
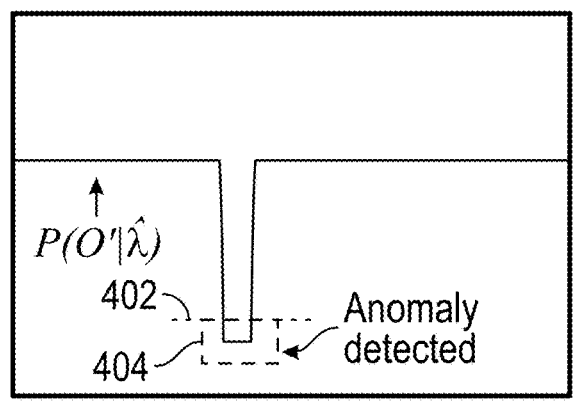
FIG. 9 is a graph illustrating a determination of an abnomal operating condition using a Hidden Markov Model, in accordance with an embodiment.

FIG. 9 illustrates a graph 400 illustrating a determination of an abnormal operating condition in an ICS using a Hidden Markov Model (HMM). For new sequences of jitter, $P(O'|\hat{\lambda})$ may be used to evaluate whether the ICS function is within normal bounds, where O' is the new sequence and $\hat{\lambda}$ is the maximum likelihood estimation of the HMM parameters. If the value is lower than a threshold 402, operation of the ICS may be deemed in an anomolous operation region 404, such as the anomaly detected in FIG. 8 using probabilistic determination.

Although the foregoing discusses using jitter probabilities to determine whether the ICS is operating within expected bounds, some embodiments may use machine learning in addition to or alternative to the probability-based detection previously discussed. Using machine learning, a baseline may be modeled and used to detect baseline changes or related malicious actions using changes to network parameters (e.g., jitter).

Incoming data may be training data and/or testing data. Modeling begins with generating a baseline fingerprint for each system from the training data. Testing and/or training may be used to determine an anomaly threshold used to test for anomalies.

The training data may be divided into ordered sub-sequences of length m. For each of the sub-sequences, a histogram with k bins may be calculated. The histograms may be stored as k-dimensional feature vectors. In some embodiments, the bin size used to calculate a baseline may be pre-calculated using training data. For example, in some embodiments, the Freedman-Diaconis rule may be used to select a size of bins to be used in a histogram. In certain embodiments, the Freedman-Diaconis rule may be applied to calculate bin size by setting $X=(x_0, x_1, \ldots, x_n)$ as the training data and setting Q1 and Q3 be the 25th and 75th percentiles of X respectively. The interquartile range of X is defined as $IQR(X)=Q_3-Q_1$. The bin size, h, may be determined using Equation 4:

$$h = 2\frac{IQR(X)}{\sqrt[3]{n}} \quad \text{(Equation 4)}$$

Multiple histograms may be combined to form the baseline. For example, the histograms may be averaged or combined using vector quantization (e.g., k-Means clustering), which may be used to separate the histograms into c clusters. The centroids obtained for each cluster in the final iteration of the vector quantization may be stored as representative histograms for each cluster. These representative histograms may serve as a fingerprint for the system baseline. By clustering the histograms in this way, rather than relying on one average histogram for the entire set of sub-sequences, more information about how the baseline jitter measurements vary over time may be included in the baseline.

An anomaly threshold may be calculated by evaluating how far the new baseline system sub-sequences are from these representative histograms. For example, the testing data may be divided into subsequences of length m with a histogram for each sub-sequence. Each new histogram may be compared against the representative histograms from the baseline fingerprint. An anomaly score may be assigned to each subsequence based on a minimum Euclidean distance from the test histogram $h_i$ to each representative histogram $H_1$. For example, the anomaly score may be determined using Equation 5:

$$anom_i = _l^{min} \sqrt{\sum_{j=1}^{k}(h_{i_j} - H_{l_j})^2},$$ (Equation 5)

where $h_{i_j}$ represents a j-th bin in an i-th test sub-sequence and $H_{l_j}$ represents the j-th bin in an l-th representative histogram. After an anomaly score is determined for each sub-sequence, an anomaly threshold, $\lambda$, may be calculated by finding the mean, $\mu$, and the standard deviation, $\sigma$, of the anomaly scores and setting $\lambda = \mu + \alpha\sigma$ where $\alpha$ is a parameter that determines how tight the anomaly threshold is relative to the standard deviation.

Figure 10:
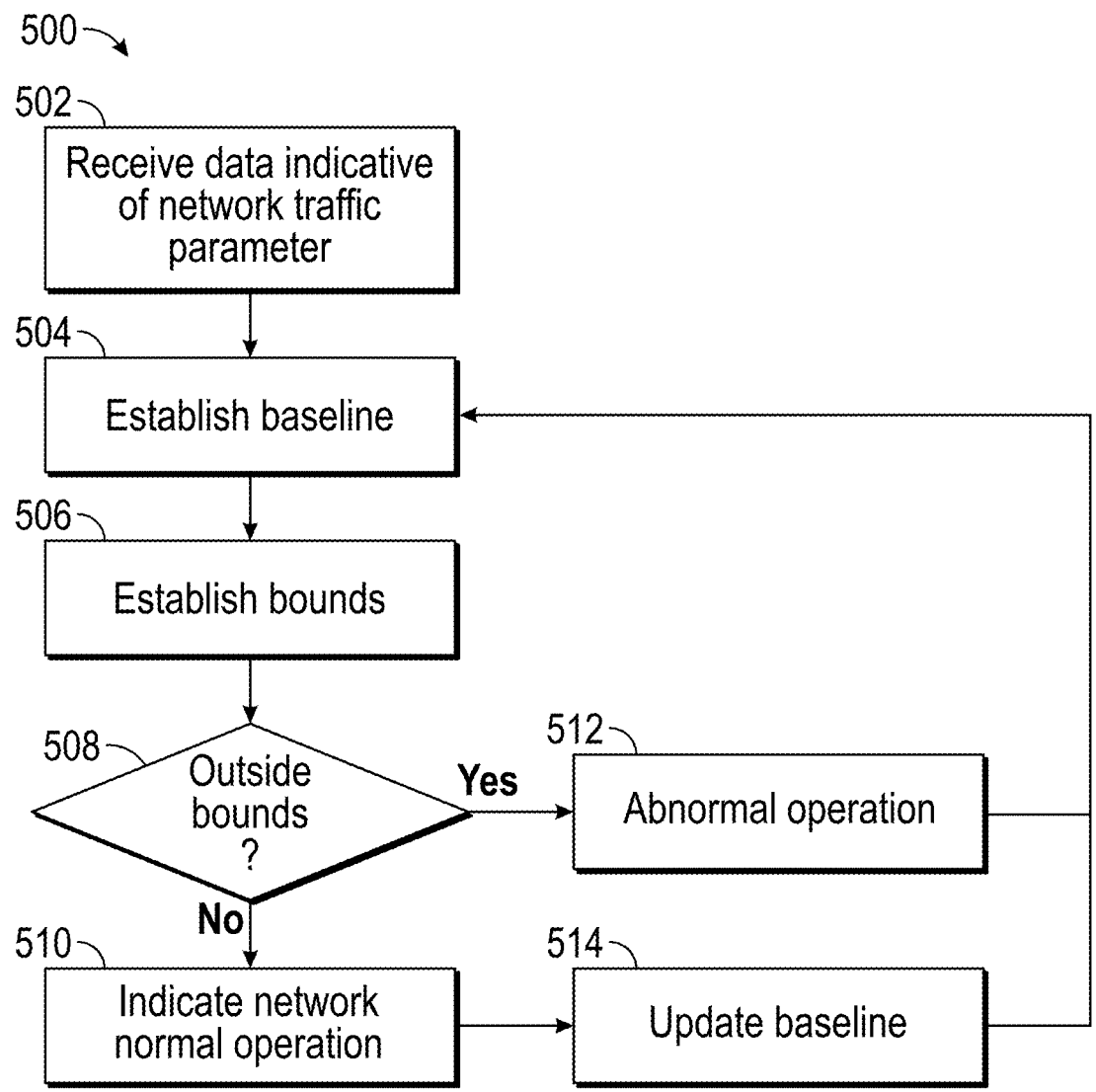
FIG. 10 is a flow diagram for a process for determining a state (e.g., abnormal or normal) of a network by determining whether network jitter falls within expected bounds/thresholds, in accordance with an embodiment.

FIG. 10 is a flowchart diagram of a process 500. One or more processors may be used to implement the SCADA and/or other portions of the ICS. The one or more processors generate and/or receive data indicative of a network traffic parameter (block 502). The network traffic parameter may include network jitter (e.g., client-centric jitter or server-centric jitter) and/or other network traffic parameters. The one or more processors then establish a baseline from the data (block 504). In some embodiments, the baseline may include a histogram. The histogram may be calculated as an average of histograms and/or may be calculated using vector quantization to combine multiple histograms to maintain information about how the baseline jitter measurements vary over time may be included in the baseline. In some embodiments, the baseline may be calculated using a probability mass function to determine likelihood of jitter based on the data. Using the baseline, the one or more processors may establish anomalous bounds or thresholds (block 506). For example, the anomalous bounds may include a threshold calculated using a mean of the network traffic parameter, a standard variance, and a restrictive constant. Alternatively, the anomalous bounds may include probability bounds on opposite sides of a probability curve using the Dvoretzky-Kiefer-Wolfowitz inequality to generate the probability bounds.

The one or more processors may then determine whether new data or the received data indicates that the traffic network parameter is outside of the anomalous bounds (block 508). If the data indicates that the traffic network parameter is not outside of the anomalous bounds, the one or more processors may determine that the network is functioning normally (block 510). If the data indicates that the traffic network parameter is outside of the anomalous bounds, the one or more processors may determine that the network is functioning abnormally (block 512). In response to either of these determinations, the one or more processors may cause a notification or report to be generated. The notification or report may initiate a diagnosal procedure to determine whether the abnormal operation may be attributed to improper device connections/cyber attacks, change in the industrial network/device configurations, or other factors.

In some cases, the data tested against the baseline may be used to update the baseline (block 514). In some embodiments, this update may occur at a specific interval or may be a running interval that updates using newly received data.

Figure 11:
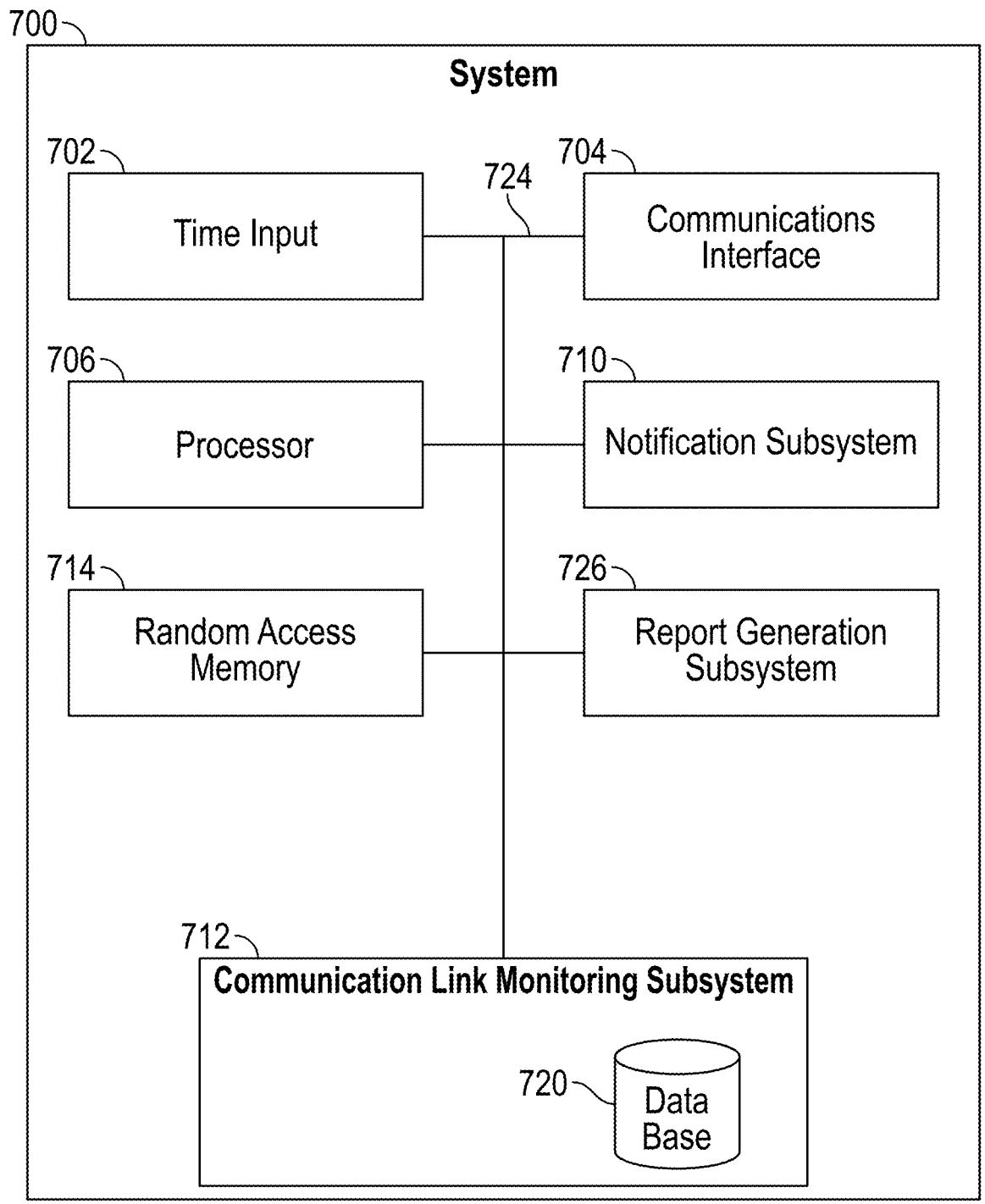
FIG. 11 is a block diagram of a system used to monitor network traffic, identify a fingerprint, and use the fingerprint to detect an anomaly of network traffic, in accordance with an embodiment.

FIG. 11 illustrates a block diagram of a system 700 to monitor network traffic, identify a fingerprint, and use the fingerprint to detect an anomaly according to any suitable embodiments described herein. In some embodiments, the system 700 may be implemented using hardware, software, firmware, and/or any combination thereof. The embodiments herein may be implemented in a network switch, router, security gateway, firewall, communications controller, or the like. Moreover, certain components or functions described herein may be associated with other devices or performed by other devices. The specifically illustrated configuration is meant to be representative of one example embodiment consistent with the present disclosure.

The system 700 includes a communications interface 704 configured to communicate with other devices (not shown). The communications interface 704 may facilitate communications with multiple devices. The system 700 may further include a time input 702, which may be used to receive a time signal (e.g., a common time reference) allowing the system 700 to apply a time-stamp to received data. In certain embodiments, a common time reference may be received via the communications interface 704, and accordingly, a separate time input may be omitted. One such embodiment may employ the IEEE 1588 protocol. A data bus 724 may facilitate communications among various components of the system 700.

The processor 706 may be configured to process communications received via the communications interface 704 and the time input 702 and to coordinate the operation of the other components of the system 700. The processor 706 may operate using any number of processing rates and architectures. The processor 706 may be configured to perform any of the various algorithms, calculations, and/or methods described herein. The processor 706 may be embodied as a general purpose integrated circuit, an application-specific integrated circuit, a field-programmable gate array, and/or any other suitable programmable logic device.

Instructions to be executed by the processor 706 may be stored in random access memory 714 (RAM). Such instructions may include information for processing routing and processing data packets received via the communications interface 704 based on multiple data flows.

A communication link monitoring subsystem 712 may be monitor communications as disclosed in more detail hereinabove. For example, the communication link monitoring subsystem 712 may determine times at which messages are sent and received and calculate jitter fingerprints using those times. The communication link monitoring subsystem 712 may establish a baseline operating fingerprint, which may include, for example, a confidence interval for future communication jitter fingerprints. The communication link monitoring subsystem 712 may compare present communications with the fingerprint and confidence interval to determine an anomaly, and may provide an alarm and information upon detection of the anomaly and/or receive an indication of a status of various communication devices and communication links over time. The communication link monitoring subsystem 712 may generate a database 720 to store information such as fingerprint information, anomaly information, and the like.

A notification subsystem 710 may generate a notification of a departure from normal parameters. The notification may alert an operator of the system 700 to potential issues so that the operator can take appropriate action. The notification may take a variety of forms and may be customized by a user to provide various levels of notification. In various embodiments, the notification may include an email message, a short message system (SMS) text message, a notification by phone, or the like.

A report generation subsystem 726 generate a report including information regarding the anomaly and how the anomaly was detected. The report may include a variety of information relating to the status of various communication devices and communication links. The information in the report may be used to perform a root cause analysis.

The embodiments described herein may be useful for different ICS monitoring applications. Furthermore, the system 700 may be used to establish a system baseline and to assess the system baseline. The system 700 may be used to assess device authenticity and/or to provide a passive detection of configuration changes. For instance, the system 700 may be used to detect device access (e.g., engineering access). The system 700 may be used to passively identify devices connected to the network. Furthermore, as previously discussed, the system 700 may be used to detect a cyber attack by passively monitoring the communications network.

While the foregoing discussion relates to determining potential attacks for ICSs, the foregoing teachings may be applied to determining an integrity of other communication systems through jitter analyses. Indeed, in some embodiments, these techniques may be applied to any system that uses a deterministic communication scheme. For instance, the techniques may be applied to avionic communication networks, automotive communication networks, military command and control systems, and/or other networks/systems that utilize a deterministic communication scheme.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present invention should, therefore, be determined only by the following claims.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A method, comprising:
   receiving, at an industrial control system, data indicative of a network traffic parameter for network traffic in an industrial network monitored by the industrial control system, wherein the network traffic parameter comprises latency-based network jitter in the industrial network;
   establishing a baseline for the latency-based network jitter based at least in part on the data;
   establishing anomalous bounds for the latency-based network jitter based at least in part on the baseline for the latency-based network jitter;
   determining whether communications in the industrial network fall within the anomalous bounds for the latency-based network jitter; and
   upon a determination that the communications in the industrial network do not fall within the anomalous bounds, indicating the industrial network is potentially under attack.

2. The method of claim 1, wherein establishing the baseline comprises generating a histogram from the data indicative of the latency-based network jitter.

3. The method of claim 2, wherein generating the histogram comprises averaging a plurality of histograms of sub-sequences of the data indicative of the latency-based network jitter.

4. The method of claim 2, wherein generating the histogram comprises performing vector quantization on a plurality of histograms of sub-sequences of the data indicative of the latency-based network jitter.

5. The method of claim 1, wherein establishing the baseline comprises generating a probability mass function for the data indicative of the latency-based network jitter.

6. The method of claim 1, wherein establishing the anomalous bounds comprises generating an anomaly score threshold for the data indicative of the latency-based network jitter.

7. The method of claim 6, wherein generating the anomaly score threshold is based at least in part on a mean and standard deviation of the data indicative of the latency-based network jitter.

8. The method of claim 7, wherein determining whether communications in the industrial network fall within the anomalous bounds for the latency-based network jitter comprises:
   determining an anomaly score for the communications using subsequent data indicative of the latency-based network jitter; and
   determining that the communications does not fall within the anomalous bounds when the anomaly score exceeds the anomaly score threshold.

9. The method of claim 1, wherein establishing the anomalous bounds comprises generating probability bounds on both sides of a probability curve for the latency-based network jitter.

10. The method of claim 9, wherein generating the probability bounds comprises using the Dvoretzky-Kiefer-Wolfowitz inequality to generate the probability bounds.

11. The method of claim 10, wherein determining whether communications in the industrial network fall within the anomalous bounds for the latency-based network jitter comprises:
    determining whether a present distribution is outside of anomalous bounds; and
    determining that the communications do not fall within the anomalous bounds when the present distribution is outside of the anomalous bounds at any point.

12. The method of claim 10, wherein determining whether communications in the industrial network fall within the anomalous bounds for the latency-based network jitter comprises:
    determining whether a present distribution is outside of anomalous bounds; and
    determining that the communications do not fall within the anomalous bounds when the present distribution is outside of the anomalous bounds by an amount greater than an anomaly threshold.

13. The method of claim 1, wherein the industrial control system comprises a supervisory control and data acquisition system, and the network traffic comprises communications within the supervisory control and data acquisition system.

14. The method of claim 1, wherein the latency-based network jitter comprises:
server-based latency, wherein the server-based latency is determined by calculating a delay between polling messages sent from a server to a client device;
client-based latency, wherein the client-based latency is determined by calculating a delay between a first polling message sent from the server to the client device, and a response to the first polling message sent from the client device to the server; or
both server-based latency and client-based latency.

15. A tangible, non-transitory, and computer-readable medium having stored thereon instructions, that when executed, are configured to cause a processor to:
operate as a component in a supervisory control and data acquisition system for an industrial control system to monitor industrial machinery by communicating within an industrial network;
generate a baseline for network jitter in the supervisory control and data acquisition system based on communications within the industrial network;
generate anomalous bounds for the network jitter based at least in part on the baseline;
determine the network jitter for the communications in the industrial network, wherein the network jitter comprises a deviation from the baseline;
determine whether the communications in the industrial network fall within the anomalous bounds for the network jitter;
upon a determination that the communications in the industrial network do not fall within the anomalous bounds, indicate the industrial network is potentially under attack; and
upon a determination that the communications in the industrial network fall within the anomalous bounds, indicate the industrial network is functioning normally.

16. The tangible, non-transitory, and computer-readable medium of claim 15, wherein the network jitter comprises server-centric jitter or client-centric jitter.

17. The tangible, non-transitory, and computer-readable medium of claim 15, wherein generating the anomalous bounds comprises generating an anomaly score threshold for the network jitter, and determining whether communications in the industrial network fall within the anomalous bounds for the network jitter comprises:

determining an anomaly score for the communications using subsequent data indicative of subsequent network jitter; and
determining that the communications do not fall within the anomalous bounds when the anomaly score exceeds the anomaly score threshold.

18. The tangible, non-transitory, and computer-readable medium of claim 15, wherein establishing the anomalous bounds comprises generating probability bounds on both sides of a probability curve for the network jitter, and wherein determining whether communications in the industrial network fall within the anomalous bounds for the network jitter comprises:
determining whether a present distribution is outside of anomalous bounds; and
determining that the communications do not fall within the anomalous bounds when the present distribution is outside of the anomalous bounds.

19. A system comprising:
memory storing instructions;
one or more processors configured to execute the instructions to cause the one or more processors to:
implement a supervisory control and data acquisition system for an industrial control system to monitor industrial machinery in an industrial network;
generate one or more thresholds for network jitter based at least in part on a generated baseline for the network jitter in the supervisory control and data acquisition system based on communications within the industrial network;
determine the network jitter based on latency measured in the communications in the industrial network;
determine whether the communications in the industrial network fall within the one or more thresholds for the network jitter;
upon a determination that the communications in the industrial network do not fall within the one or more thresholds, indicate that the industrial network is potentially under attack; and
upon a determination that the communications in the industrial network fall within the one or more thresholds, indicate that the industrial network is functioning normally.

20. The system of claim 19, wherein the one or more thresholds comprise thresholds on either side of a probability curve based on a probability mass function, and the communications comprise a present distribution of network jitter to be tested for abnormality.

* * * * *